INVENTORS.
WILLIAM J. KILLBERY
VICTOR W. REIMER
BY
Merchant & Gould
ATTORNEYS

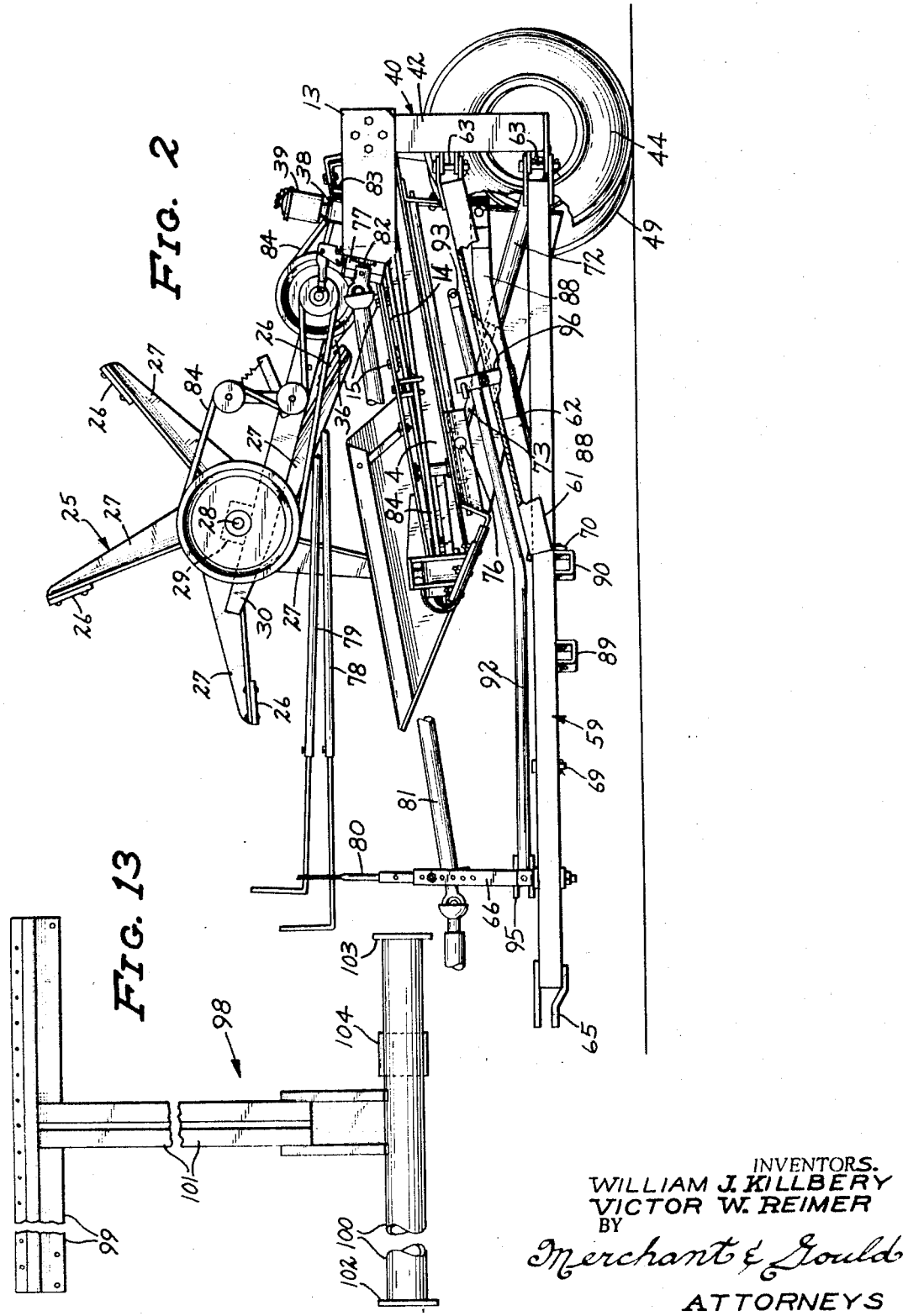

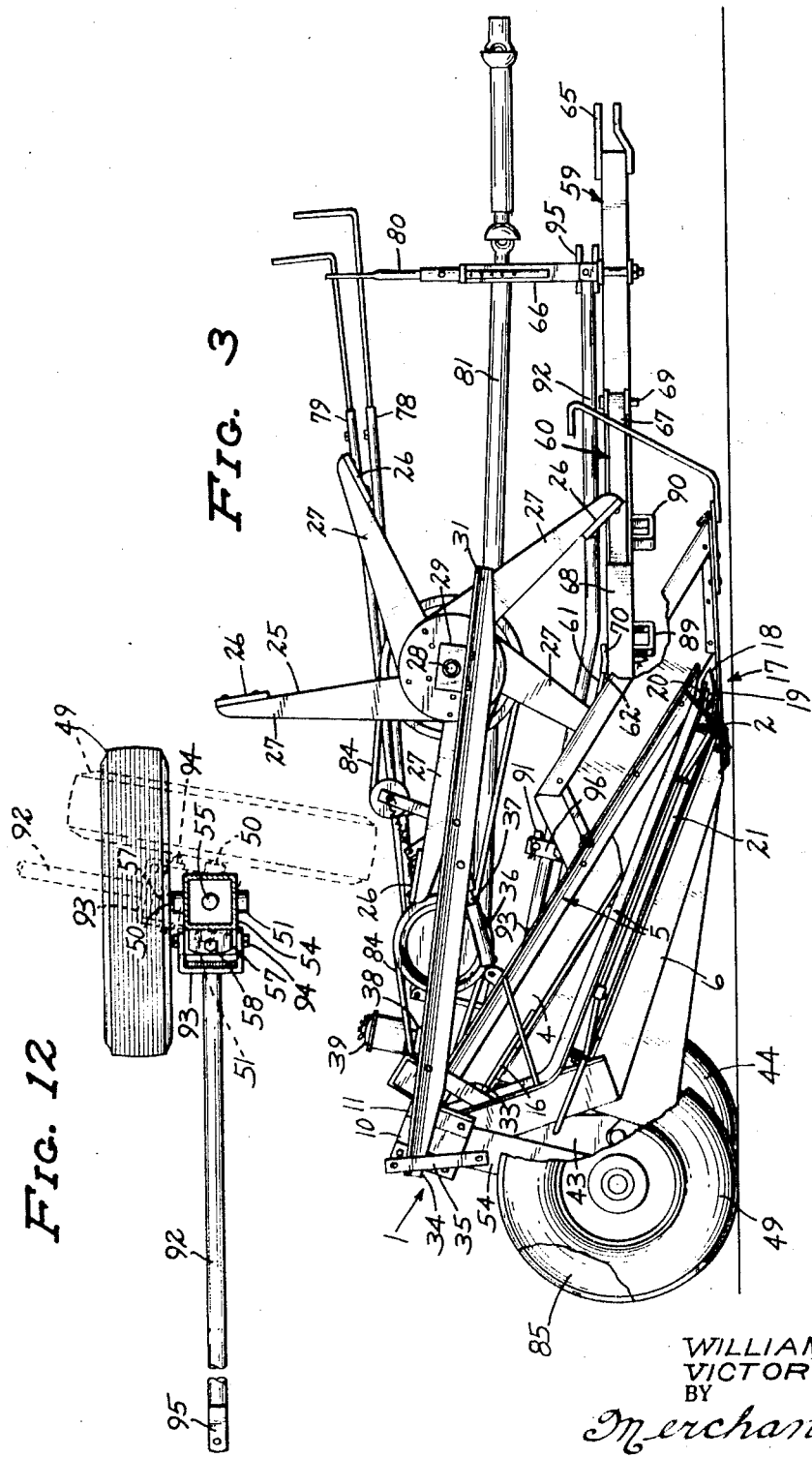

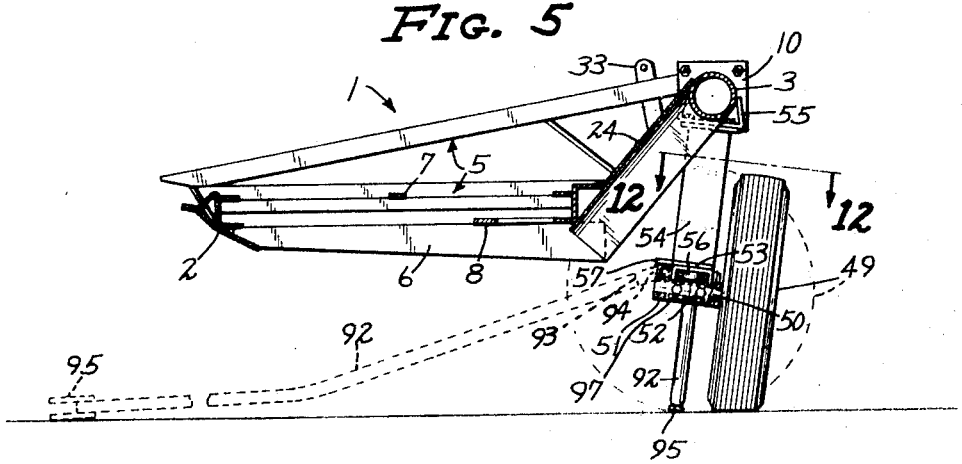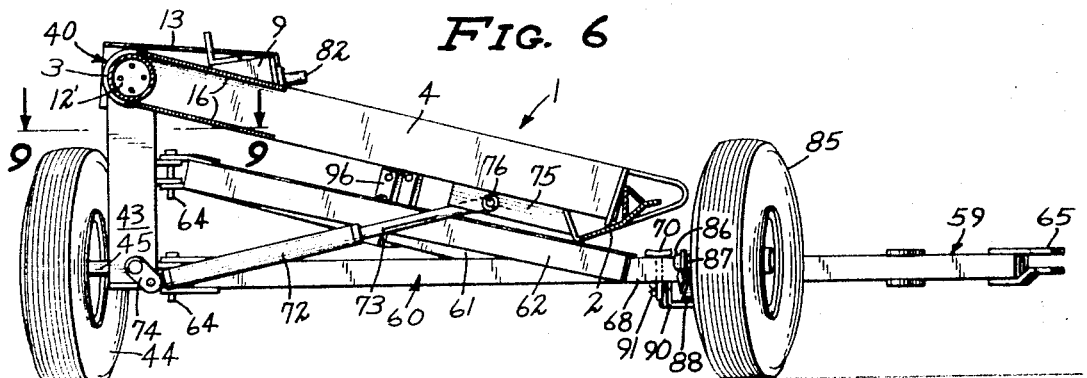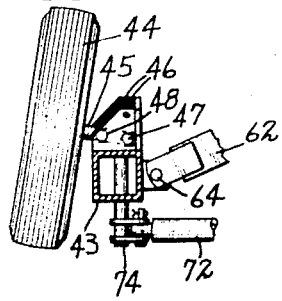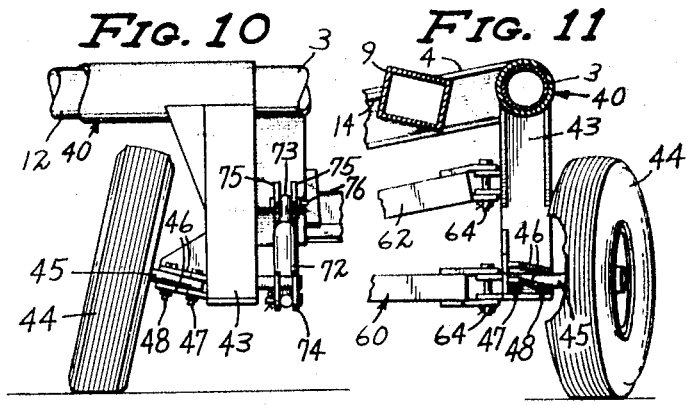

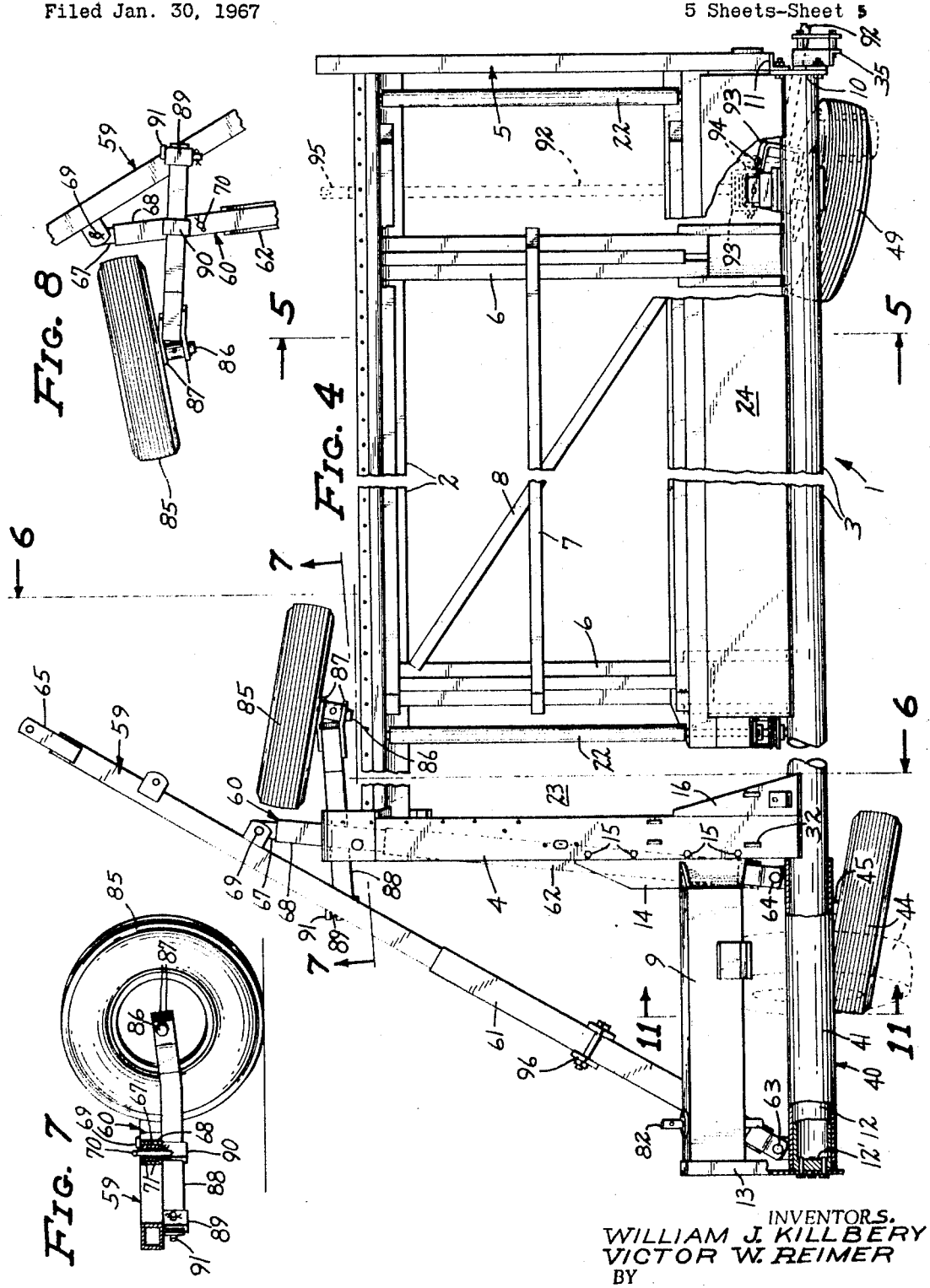

United States Patent Office 3,457,709
Patented July 29, 1969

3,457,709
PULL-TYPE SWATHER
William J. Killbery, Headingly, Manitoba, and Victor W. Reimer, Winnipeg, Manitoba, Canada, assignors to Killbery Industries Ltd., Winnipeg, Manitoba, Canada, a corporation of Canada
Filed Jan. 30, 1967, Ser. No. 612,595
Int. Cl. A01d 41/02, 75/22
U.S. Cl. 56—23      12 Claims

ABSTRACT OF THE DISCLOSURE

A pull-type swather including a frame carrying a mower, a reel overlying the mower and a cut crop conveyor rearwardly of the mower. A hitch bar and mounting wheels for the frame are bodily movable relative to the frame to enable the swather to be pulled selectively in an operative mowing position, and a pair of angularly displaced transport positions relative to a towing vehicle. The swather comprises a generally rectangular frame including a generally horizontally disposed front frame member, a rigid tubular rear frame member generally parallel to the front frame member, and spaced inner and outer side frame members connecting the front and rear frame members. The swather further includes mower structure on the front frame member, transverse conveyor means carried by the frame, and a pivot frame including a tubular frame element having telescopic engagement with said tubular rear frame member for relative rotation therebetween on the common axis thereof, the pivot frame including a pair of laterally spaced rigid inner and outer legs depending from the tubular pivot frame element. Forwardly projecting primarily and secondary hitch bars have rear ends pivotally connected to the inner and outer legs respectively on generally vertical axes, the front end of said primary hitch bar having coupling means for connection to the tractor, the front end of the secondary hitch bar being pivotally connected to the primary hitch bar rearwardly of said coupling means, on a generally vertical axis. One of the hitch bars is extensible and retractable to permit lateral swinging movements of the hitch bars between a swather operative position, wherein the primary hitch bar is disposed substantially normal to the axis of the tubular rear frame member, and a swather transport position angularly displaced from its swather-operative position in a direction toward the outer side frame member, wherein the secondary hitch bar is adapted to underlie the adjacent inner side frame member to support the front end portion of the swather in a transport position. The swather is supported in its operative position partly by engagement of the hitch bar coupling means with the prime mover, the greater part of the weight of the swather being supported by a pair of laterally inner and outer supporting wheels pivotally mounted to the pivot frame and swather frame respectively for bodily movements between swather operative positions, generally parallel to the direction of operative swather movement, and transport positions generally transversely of swather operative movement. Means is provided for releasably locking at least one of said supporting wheels in either of the above positions. The invention further involves the positioning of one of said wheels in its swather-operative position to urge the swather toward its true operative position, wherein the mower structure thereof extends a direction substantially normal to the direction of movement thereof, during forward movement of the swather, and without the necessity for special bracing means between the swather and the prime mover.

One of the objects of this invention is the provision of a swather having means whereby the same can be quickly and easily converted from an operative condition, wherein it is able to cut a relatively wide swath, to selected ones of a pair of transport conditions, in one of which transport conditions it occupies a relatively narrow space for over-the-road travel.

Another object of this invention is the provision of a swather having a tractor hitch connection at one side only thereof, and mounting means disposing a support wheel in such manner that the swather will track normally during operative swather travel.

Another object of this invention is the provision of a swather having hitch bar means which can be quickly and easily shifted between angularly spaced swather operative and transport positions, and means readily mountable thereon and cooperating therewith for supporting a portion of the transport thereof in an inoperative condition.

Yet another object of this invention is the provision of a swather which is light in weight but extremely rigid in construction.

Another object of this invention is the provision of a swather having frame means adapted to readily mount frame extension portions whereby the width of the swath cut by the swather may be easily increased or decreased, as desired. The above, and still further highly important objects and advantages of this invention will become apparent from the following detailed specification, appended claims and attached drawings.

Referring to the drawings, in which like reference characters indicate like parts, throughout the several views:

FIG. 2 is an enlarged view in side elevation, as seen from the left with respect to FIG. 1, some parts being broken away;

FIG. 3 is an enlarged view in end elevation as seen from the right with respect to FIG. 1, some parts being broken away;

FIG. 4 is an enlarged fragmentary view in top plan of the framework of the swather of FIG. 1, showing a different position of some of the parts, some parts being broken away and some parts being shown in section;

FIG. 5 is a transverse section taken on the line 5—5 of FIG. 4;

FIG. 6 is a transverse section taken on the line 6—6 of FIG. 4;

FIG. 7 is a fragmentary view partly in section and partly in elevation, taken on the line 7—7 of FIG. 4;

FIG. 8 is a fragmentary view in bottom plan of the parts shown in FIG. 7;

FIG. 9 is a horizontal section taken on the line 9—9 of FIG. 6;

FIG. 10 is a fragmentary view in rear elevation, as seen from the line 10—10 of FIG. 1;

FIG. 11 is a fragmentary transverse section taken on the line 11—11 of FIG 4, some parts being broken away;

FIG. 12 is a fragmentary section taken substantially on the line 12—12 of FIG. 5, showing a different position of some of the parts; and FIG. 13 is a fragmentary view in top plan of a swather frame extension of this invention.

Figure 1:
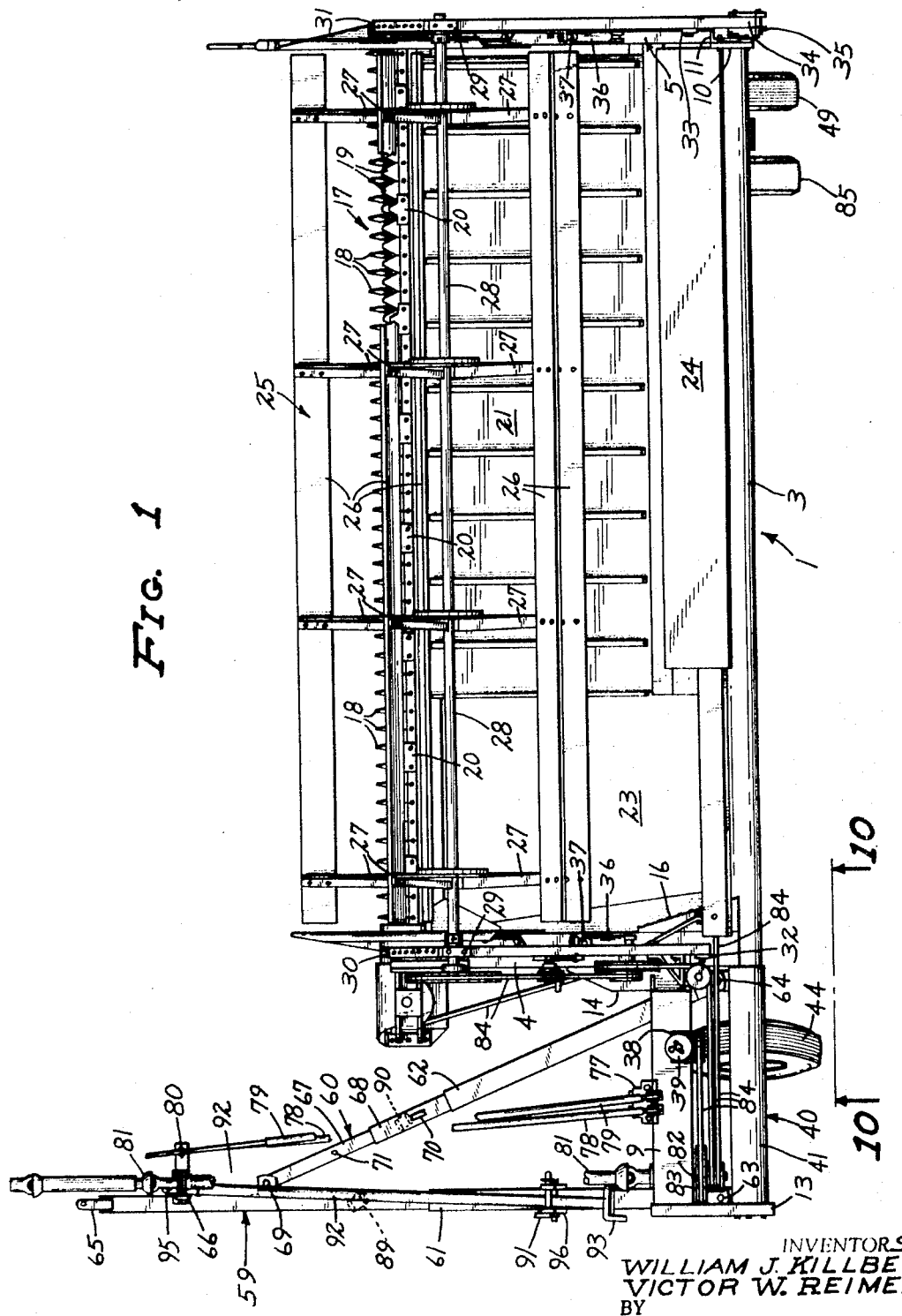
FIG. 1 is a view in top plan of a swather produced in accordance with this invention, some parts being broken away.

In the preferred embodiment of the invention illustrated, numeral 1 indicates, in is entirety, a generally rectangular swather frame comprising, a horizontally disposed elongated frame member 2, a horizontal rigid tubular rear frame member 3 disposed in rearwardly spaced parallel relationship to the front frame member 2, laterally spaced parallel inner and outer side frame members 4 and 5 respectively, intermediate frame members 6 disposed in spaced parallel relationship to each other and to the side frame members 4 and 5, brace members 7 and 8, and a drive frame member 9 secured to the inner side frame member 4, and disposed in forwardly spaced parallel relationship to the adjacent inner end portion of the tubular rear frame member 3. The rear ends of the inner side frame member 4 and intermediate frame members 6 are welded to the tubular rear frame member 3 at spaced points intermediate the ends of the rear frame member 3, and the front frame member 2 is bolted or otherwise rigidly secured to the front ends of the side and intermediate frame members 4–6. At its outer end, the rear frame member 3 is provided with a radially outwardly projecting peripheral flange 10 to which is bolted or otherwise releasably anchored the rear end of the outer side frame member 5, said rear end including an anchoring angle member 11. As shown in FIGS. 1 and 4, the inner end portion 12 of the rear frame member 3 extends laterally beyond the inner side frame member 4 behind the drive frame member 9 and is provided with a closed inner end 12′ to which is bolted or otherwise releasably secured a rearwardly projecting drive frame portion 13, the front end of the portion 13 being welded or otherwise rigidly secured to the adjacent end of the drive frame member 9. As shown in FIG. 4, the end of the drive frame member 9 adjacent the inner side frame member 4 is provided with a mounting flange 14 that is bolted to the inner side frame member 4, as indicated at 15, see FIG. 4. The side frame member 4 is reinforced in its connection to the tubular rear frame member 3 by gussets or the like 16 welded to the frame members 3 and 4.

Conventional mower structure 17 is mounted on the front frame member 2 and includes a plurality of guards 18 and cooperating reciprocatory sickle knives 19 and retainer clips or the like 20. An endless conveyor belt or draper 21 is entrained over a pair of draper rolls 22 that are journalled in the swather frame 1 on axes generally parallel to the frame members 4–6. The draper 21 extends laterally from the outer side frame member 5 to a point in laterally outwardly spaced relation to the inner side frame member 4 to define therewith a discharge space or opening 23, see FIG. 1. The draper 21 is disposed rearwardly of the mower structure 17, and extends therebetween and a rear guide wall 24 secured to the frame members 5 and 6 and the tubular rear frame member 3. A conventional reel 25 comprises a plurality of circumferentially spaced batts 26 mounted on the radially outer ends of spokes or arms 27 secured at their inner ends to a reel shaft 28 that is journalled on a horizontal axis parallel to the front and rear frame members 2 and 3, in bearings 29 mounted on the front end portions of a pair of inner and outer reel-carrying arms 30 and 31 that extend generally forwardly from the rear end portions of the side frame members 4 and 5 respectively. The rear end portions of the arms 30 and 31 are pivotally secured to pivot brackets or the like 32 and 33 respectively, extending upwardly from their respective side frame members 4 and 5. The rear end portion 34 of the outer arm 31 extends through and has sliding engagement with a guide bracket 35 bolted or otherwise secured to the flange 10, see FIGS. 1, 3 and 4. The reel 25 is raised and lowered relative to the swather frame 1 by means of a pair of fluid pressure operated cylinders 36 and cooperating piston rods 37, the cylinders 36 being pivotally secured to respective ones of the inner and outer side frame members 4 and 5, their cooperating piston rods 37 being pivotally secured to their adjacent reel-carrying arms 30 and 31. Fluid under pressure is supplied to the cylinders 36 from a fluid pump 38 mounted on the drive frame member 9 and equipped with a fluid reservoir 39.

A pivot frame 40 is disposed adjacent the inner side frame 4 and comprises a rigid tubular frame element 41 telescopically received over the inner end portion 12 of the tubular rear frame member 3, and a pair of depending legs 42 and 43 welded at their upper ends to opposite end portions of the tubular element 41. The tubular element 41 closely encompasses the end portion 12 of the rear swather frame member 3 for relative rotation therebetween, one end of the tubular element 41 engaging the rear end portion of the inner side frame member 4 and the other end engaging the drive frame portion 13, whereby to limit axial movement between the tubular frame element 41 and the tubular frame member 3. A ground-engaging inner supporting wheel 44 is journalled on a spindle 45 mounted in a bifurcated bracket 46 by means of nut-equipped pivot and locking bolts 47 and 48 respectively, the wheel 44 and spindle 45 being bodily movable about the axis of the pivot bolt 47 between a swather operative position shown by full lines in FIGS. 1–3 and 10, and by dotted lines in FIG. 4, and a swather transport position shown in full lines in FIG. 4 and in FIGS. 6, 9 and 11. In the embodiment of the invention illustrated, the bracket 46 is so disposed that, when the supporting wheel 44 is moved to its swather operative position, the wheel 44 is disposed in a plane extending longitudinally of the direction of operative travel of the swather, said plane being tilted or sloping upwardly and laterally outwardly toward the outer end frame member 31 of the swather, as clearly shown in FIG. 10. When the wheel 44 is moved to and locked in its swather transport position, the wheel 44 is disposed in a generally vertical plane extending generally longitudinally of the swather frame member 3, or at an acute angle thereto.

The outer end of the swather is supported by a supporting wheel 49 similar to the wheel 44 and journalled on an axial shaft 50 that is telescopically received in one end of a mounting tube 51 and releasably locked therein by means of a set screw or the like 52, see FIG. 5. The mounting tube 52 is welded or otherwise rigidly secured to a bracket 53 that is pivotally secured to the lower end of a support leg 54, the upper end of the support leg 54 being bolted or otherwise rigidly secured to a saddle 55 welded to the adjacent end portion of the tubular rear frame member 3, see particularly FIG. 5. The leg 54 is generally vertically disposed, and at its lower end, is provided with an axial pivot shaft or the like 56 by means of which the bracket 53 is pivotally secured to the leg 54. As shown particularly in FIGS. 5 and 12, the lower end of the leg 54 is provided with a forwardly projecting tongue 57 in which is removably mounted a headed pin or bolt 58 that is adapted to be received in an aperture, not shown, in the bracket 53 when the wheel 49 is disposed in its full line position shown in FIGS. 1–3 and 12, and its dotted line position shown in FIGS. 4 and 5. This is the swather operative position of the supporting wheel 49, the same being generally parallel to the adjacent side frame member 5. When the bolt 58 is removed, the wheel 49 may be bodily moved about the axis of the pivot shaft 56 so as to act as a steerable wheel for the over-the-road transport of the swather, as will hereinafter become apparent. However, when the pin or bolt 58 is inserted into aligned apertures in the tongue 57 and bracket 53, the wheel 49 is held in its above-described swather operative position.

A pair of generally horizontally disposed elongated primary and secondary hitch bars 59 and 60 extend forwardly from the pivot frame 40, the hitch bars 59 and 60 each including a respective upwardly and rearwardly sloping brace member 61 and 62. The rear ends of the primary hitch bar 59 and brace member 61 are pivotally secured to the lower end and intermediate portions respectively of the pivot frame leg 42 by means of aligned vertically disposed pivot pins 63, see particularly FIG. 2. In like manner, the rear ends of the secondary hitch bar 60 and brace member 62 are pivotally secured to the lower end and intermediate portions of the pivot frame leg 43 by axially aligned vertical pivot pins or the like 64, see FIG. 11. The front end of the primary hitch bar 59 is provided with a bifurcated coupling 65, by means of which the swather is connected to the drawbar of a prime mover such as a tractor, not shown. A support bracket 66 extends upwardly from the front end portion of the primary hitch bar 59, rearwardly of the coupling 65, for a purpose which will hereinafter be described. The secondary hitch bar 60 is longitudinally extensible and retractable, the same comprising telescoping front and rear hitch bar sections 67 and 68, the former having its front end pivotally secured to the primary hitch bar 59 rearwardly of the support bracket 66, as indicated at 69. As shown, the brace member 62 is welded or otherwise rigidly secured at its front end to the rear secondary hitch bar section 68.

The telescopic arrangement of the secondary hitch bar sections 67 and 68 permits the hitch bars 59 and 60 to be moved between a swather operative position shown in FIG. 1, wherein the primary hitch bar 59 is disposed substantially normal to the longitudinal dimension of the swather, or normal to the front and rear swather frame members 2 and 3, and an angularly displaced swather transport position shown in FIG. 4, wherein the secondary hitch bar 60 underlies the front end portion of the inner side frame member 4, when the swather frame 1 is raised to an inoperative transport position shown in FIGS. 2 and 4–6. The hitch bars 59 and 60 are releasably locked in either of these positions by a T-shaped locking pin 70 that is adapted to be inserted into a suitable opening in the rear secondary hitch bar section 68 and selectively into a pair of openings 71, one of which is shown in FIG. 1, in the hitch bar section 67, each of the openings 71 being alignable with the above-mentioned opening in the hitch bar section 68.

The swather frame 1 is pivotally movable about the common axis of the tubular frame 3 and pivot frame element 41 between an operative position, wherein the front swather frame member 2 is disposed close to ground level, as shown in FIG. 3, and a transport position, wherein the front end portion of the swather frame 1 and parts carried thereby is raised above the level of the hitch bars 59 and 60, as shown in FIGS. 2, 5 and 6. Means for thus raising and lowering the front end portion of the swather frame 1 comprises a fluid pressure cylinder 72 and a cooperating piston plunger rod 73 extending axially outwardly from one end of the cylinder 72. The opposite closed end of the cylinder 72 is pivotally mounted to a holder 74 at the lower end of the pivot frame leg 43, the free end of the plunger rod 73 being pivotally secured to a pair of plate-like members 75 of the inner side frame member 4, as indicated at 76, see particularly FIGS. 2, 6 and 10. Like the reel arm cylinders 36, the frame elevating cylinder 72 is operatively connected to the fluid pump 38 by means of fluid connections not shown but including valve means 77 mounted on the drive frame member 9. The valve means 77 is controlled by the operator one the prime mover, not shown, through the medium of a pair of elongated control rods 78 and 79 that extend forwardly from the valve means 77 and which are supported in a support bracket extension 80, see FIGS. 1–3.

Means for driving the mower structure 17, draper 21, reel 25 and pump 38 comprises an articulated drive shaft 81 that is supported intermediate its ends in the support bracket 66 and which is adapted to be connected at its front end to the power take-off of a prime mover such as a tractor, not shown. The rear end of the shaft 81 is connected to a shaft 82 that is journalled in the drive frame 9 and on which is mounted a multigroove pulley 83 having various belts 84 entrained thereover, the belts 84 being operatively connected to the mower structure 17, draper 21, reel 25 and pump 38. Such drive mechanism is well known in the art. Hence, further detailed showing and description thereof is omitted, in the interest of brevity.

The location of the inner supporting wheel 44 in close proximity to the rear end of the primary hitch bar 59 materially aids the swather of this invention to maintain the longitudinal dimension of the swather normally disposed to the direction of operative travel thereof over a field, by resistance to lateral movement of the wheel 44 in its engagement with the ground. Thus, it is only necessary that the connection between the coupling 65 and the tractor drawbar needs to be the only connection between the swather and the prime mover except for the drive connection of the drive shaft 81 with the power take-off of the prime mover, and the necessity for other bracing between the swather and the prime mover is eliminated. By disposing the bracket 46 at an angle to tilt the supporting wheel 44, as shown, resistance to laterally inward movement of the wheel 44 is enhanced.

When it is desired to tow the swather from one field of operation to another, fluid under pressure is introduced to the cylinder 72 to raise the front end portion of the swather to its inoperative or transport position shown in FIGS. 2 and 4–6. The pin 70 is then disengaged from the telescoping sections 67 and 68 of the secondary hitch bar 60 and the primary hitch bar 59 is swung from its position of FIG. 1 to its position of FIG. 4, and the pin 70 reinserted into the aligned openings in the telescoping sections 67 and 68. The swather frame is then permitted to be lowered until the front end portion of the inner side frame member 4 rests upon the front end portion of the secondary hitch bar 60, after which the swather may be easily towed by the prime mover to the desired location. It will be appreciated that the hitch bar 59 need not be disconnected from the prime mover to shift the same between its swather operative and transport positions, this being easily done by manipulating the prime mover. Then, when it is desired to again operate the swather, it is only necessary to raise the front end portion of the swather out of engagement with the underlying secondary hitch bar 60, pull the pin 70, and drive the prime mover forwardly until the primary hitch bar 59 is disposed at right angles to the swather frame members 2 and 3, and reinsert the pin 70, after which the swather may be lowered to its operative position.

For the purpose of transporting the swather on a road or highway and in such manner that the swather will not occupy more than its own traffic lane, a transport kit is provided, the kit comprising a third ground-engaging wheel 85 pivotally mounted on an axial spindle 86 that is removably secured in the bifurcated end 87 of a mounting bar 88. The mounting bar 88 is adapted to be received in a pair of hanger elements 89 and 90 welded or otherwise rigidly secured each to a respective one of the hitch bar 59 and hitch bar section 68, see FIGS. 3, 7 and 8. A locking pin 91 is insertable through aligned openings in the hanger element 89 and mounting bar 88 to releasably lock the mounting bar 88 to the primary and secondary hitch bars 59 and 60. Further, the transport kit includes a towing bar 92 having a bifurcated inner end 93 that is releasably pivotally secured to the brackets 53 by means of a nut-equipped bolt or the like 94, see particularly FIG. 12. The outer end of the towing bar 92 is provided with a coupling 95 for attachment to a tractor or other prime mover.

As shown by dotted lines in FIG. 4, and with the swather frame 1 moved to its raised transport position, the towing bar 92 may be secured to the bracket 53. The locking bolt 58 is then removed from the bracket 53 and tongue 57, rendering the supporting wheel 49 dirigible. The towing bar 92 is then swung laterally outwardly to its full line position of FIGS. 4 and 5 and coupled to a prime mover for transport. It will be appreciated that, when the transport kit is used, the supporting wheel 44 is bodily moved from its dotted line position of FIG. 4 to its full line position shown therein and in FIGS. 9 and 11. It will be further noted that when the supporting wheel 49 is bodily moved to its over-the-road transport position, shown by full lines in FIG. 4, the same slopes upwardly and rearwardly, due to the pivotal movement of the tubular rear frame member 3, caused by raising of the front end portion of the swather frame 1 to its inoperative position. This upward and rearward slope of the supporting wheel 49 aids in preventing the swather from wandering laterally during over-the-road travel.

During operation of the swather, the transport kit is stored on the primary hitch bar 59 and brace member 61, one end of the towing bar 92 being supported by the lower end portion of the support bracket 66, the opposite end of the towing bar 92 and the mounting bar 88 being mounted in a suitable clip or holder 96 on the brace member 61, see FIG. 2. During operation of the swather in field conditions where the ground is relatively soft, the third wheel 85 may be disconnected from its mounting bar 88 and the shaft 86 thereof inserted into the opposite end of the mounting tube 51 associated with the supporting wheel 49, and locked in place by a second set screw, or the like 97, screw-threaded into the tube 51. Thus, the outer end of the swather is supported by a dual wheel arrangement, making for easier travel over soft ground.

The construction of the swather frame 1 enables the same to be quickly and easily elongated to increase the width of the swath cut and windrowed thereby. This is accomplished with the use of a swather frame extension 98, shown in FIG. 13 as comprising, a front frame member 99, similar to the front frame member 2, a rigid tubular rear frame member 100, and a transverse frame member 101 similar to the intermediate frame members 6, the frame member 101 being welded or otherwise rigidly secured at its front and rear ends to the front and rear frame members 99 and 100 respectively.

At its inner and outer ends respectively, the frame member 100 is provided with radial flanges 102 and 103, similar to the flange 10 of the rear frame member 3. Intermediate its ends, the frame member 100 is provided with a saddle 104 similar to the saddle 55.

When it is desired to increase the capacity of the swather, the outer side frame member 5 and parts associated therewith are removed from the frame 1, and the extension frame 98 is mounted to the frame 1 in place of the outer side frame 5 by bolting the end flange 102 in face-to-face relationship to the flange 10, and securing the inner end of the front frame member 99 to the adjacent end of the front frame member 2 by suitable means, not shown. The outer side frame member 5 is then connected to the flange 103, and to the adjacent outer end of the front frame member 99. The supporting leg 54 is removed from its saddle 55 and secured to the saddle 104 to support the swather frame adjacent its extended outer end portion, and mower, draper and reel extensions, not shown, for the mower structure 17, draper 21 and reel 25 respectively, may be mounted on and secured thereto in conventional manner.

While a commercial embodiment of the swather of this invention is shown and described, it will be appreciated that the same is capable of modification without departure from the spirit and scope of the invention.

What is claimed is:

1. A pull-type swather comprising:
    (a) a generally rectangular swather frame including a generally horizontally disposed front frame member, a rigid tubular rear frame member generally parallel to said front frame member, and spaced inner and outer side frame members connecting said front and rear frame members,
    (b) mower structure mounted on said front frame member,
    (c) transverse conveyor means carried by said swather frame rearwardly of said mower structure,
    (d) a pivot frame including, a rigid horizontally disposed frame element having telescopic engagement with said tubular rear frame member for relative rotation therebetween on the axis of said tubular rear frame member, and a pair of laterally spaced depending inner and outer legs each rigidly secured at its upper end to said frame element,
    (e) a pair of elongated primary and secondary hitch bars pivotally connected at their rear ends to said inner and outer legs respectively on generally vertical axes and converging forwardly in the general direction of operating movement of the swather, one of said hitch bars being longitudinally extensible and contractable;
    (f) coupling means on the front end of said primary hitch bar for connection to a prime mover,
    (g) means pivotally connecting the front end of said secondary hitch bar to said primary hitch bar rearwardly of said coupling means, whereby said primary hitch bar may be swung about the axis of pivotal connection thereof to said pivot frame between a swather operating position generally normal to the axis of said tubular frame member and a swather transport position angularly displaced in the direction of said outer side frame member,
    (h) said secondary hitch bar being disposed to underlie a portion of said inner side frame member in said angularly displaced swather transport position of the primary hitch bar, to support the front end portion of said swather frame,
    (i) a pair of inner and outer supporting wheels,
    (j) and means mounting said outer wheel to said swather frame adjacent the rear end of said outer side frame member and said inner wheel to one of said legs of the pivot frame.

2. The swather defined in claim 1 in which said pivot frame element comprises a rigid tube telescopically receiving a portion of said tubular rear frame member adjacent said inner side frame member, characterized by means for positively limiting axial movement of said tube relative to said tubular rear frame member.

3. The swather defined in claim 1 in which said secondary hitch bar comprises a pair of front and rear hitch bar elements disposed in longitudinal overlapping relationship, said rear hitch bar element being pivotally secured to one of said legs, said front hitch bar element being secured to said rear hitch bar element for longitudinal movement relative thereto, characterized by means for releasably locking said hitch bar elements against said relative longitudinal movement.

4. The swather defined in claim 1 in which said means mounting said inner and outer wheels comprise pairs of cooperating mounting members, one member of each of said pairs being operatively associated with a different one of said wheels, the other members of said pairs being connected to respective ones of said swather frame and pivot frame leg, said cooperating members mounting their respective wheels for bodily movement of said wheels between swather operative positions, generally parallel to the direction of operative travel of the swather, and swather transport positions generally normal to said swather operative positions, and means for releasably locking said wheels in selected ones of said positions.

5. The swather defined in claim 1 in which the means mounting said inner wheel comprises a pair of cooperating mounting members one on said one of the legs and the other associated with said inner wheel and arranged to dispose said inner wheel selectively in a swather operative position in a plane parallel to the direction of operating movement of the swather and sloping upwardly and laterally outwardly toward said outer side frame member, and a swather transport position in a generally vertical plane angularly displaced from the direction of operative movement of the swather.

6. The swather defined in claim 1 in which said swather frame includes a supporting leg having an upper end rigidly secured to said tubular frame member and depending therefrom adjacent said outer side frame member, the means mounting said outer wheel to the swather frame comprising a pair of cooperating mounting members, one on said support leg and the other associated with said outer wheel and arranged to dispose said outer wheel selectively in a swather operative position in a generally vertical plane parallel to the direction of operating movement of the swather, and in a swather transport position angularly displaced from said swather operating position wherein said outer wheel is disposed in a plane sloping upwardly and generally rearwardly of the direction of operating movement of the swather.

7. The swather defined in claim 1 characterized by fluid pressure operated means for varying the elevation of said mower structure and comprising a fluid pressure cylinder and a cooperating plunger rod one of which is connected to said inner side frame member forwardly of said tubular swather frame member and the other of which is connected to said outer pivot frame leg adjacent the lower end thereof, and means including a pump for delivery of fluid under pressure to said cylinder.

8. The swather defined in claim 1 characterized by a third support wheel and mounting means for removably mounting said third wheel to the swather in the transport position thereof.

9. The swather defined in claim 8 in which said last-mentioned means comprises a rigid generally horizontal mounting arm having one end provided with means journalling said third wheel, a pair of bracket elements, one on each of said primary and secondary hitch bars and defining arm-receiving openings which move into alignment responsive to predetermined swinging movement of said primary hitch bar toward its swather transport position, and means for releasably locking said arm within said brackets.

10. The swather defined in claim 1 in which said swather frame includes a pair of intermediate frame members disposed between and in spaced generally parallel relation to said inner and outer side frame members, said inner side and intermediate frame members being welded to said tubular rear frame member, said outer side frame member being releasably secured to said front and rear frame members.

11. The swather defined in claim 1 characterized by a towing bar having means at one end releasably securing said towing bar to said outer supporting wheel and coupling means at its opposite end for connection to a prime mover, whereby said swather is adapted to be connected to a prime mover by said tow bar and primary hitch bar selectively.

12. The swather defined in claim 1 characterized by means for removably securing said outer side frame member to said front and rear frame members, and an extension frame including a front frame member, a rigid tubular rear frame member, and a transverse frame member, said rear frame member having means at one end for attachment to said first-mentioned rear frame member in axial alignment therewith and at its other end for attachment to said outer frame member, said means for mounting said outer wheel to the swather frame including a mounting leg and means on each of said tubular rear frame members for selective mounting of said mounting leg.

References Cited
UNITED STATES PATENTS

| | | | |
|---|---|---|---|
| 2,395,672 | 2/1946 | Kranick | 56—23 |
| 2,950,927 | 8/1960 | Hendrickson | 280—412 X |
| 3,142,144 | 7/1964 | Ronning | 56—228 |

ANTONIO F. GUIDA, Primary Examiner

A. E. KOPECKI, Assistant Examiner

U.S. Cl. X.R.

56—228